3,114,720
MANUFACTURE OF SPHERICAL ALUMINA
William G. Nixon, Westchester, Ill., assignor to Universal Oil Products Company, Des Plaines, Ill., a corporation of Delaware
No Drawing. Filed June 6, 1960, Ser. No. 33,953
7 Claims. (Cl. 252—448)

In a broad application, the present invention relates to the manufacture of alumina; more specifically, the present invention is directed toward a novel method for producing spherical alumina particles having improved physical characteristics. When subsequently employed in the preparation of various catalytic composites, such as an alumina-platinum catalyst, the alumina particles manufactured according to the method of the present invention result in a composite possessing an unexpected degree of activity, as well as the stability, or capability to perform its intended function for an extended period of time.

Through the utilization of the method of the present invention spherical alumina particles are produced which are especially adaptable to utilization as the carrier material in the subsequent manufacture of catalytic composites. The alumina particles of the present invention form an excellent absorbing or desorbing medium when utilized as a desiccant, or other treating or purifying agent. When ultimately employed as the carrier material for catalytically active metallic components, these spherical alumina particles are especially suited for utilization in processes for the catalytic reforming and isomerization of hydrocarbons and mixtures thereof, and are advantageously employed in processes for the catalytic or thermal-cracking of hydrocarbons.

Alumina is widely employed throughout many types of commercial industries, and is extensively utilized within the chemical and petroleum industries as a carrier material for catalytically active metallic components, or, in isolated instances, as a catalyst in and of itself, as in high-temperature cracking processes. Alumina, with or without the addition of other refractory inorganic oxides such as silica, magnesia, thoria, boria, titania, zirconia, etc., and mixtures thereof, are suitably employed as dehydrating, desorbing, treating, adsorbing, and purifying agents. The high degree of porosity, possessed by refractory inorganic oxides, is one of the more prominent factors affecting extensive use in removing solid contaminants from liquid and gaseous streams, liquid contaminants from gaseous streams, etc. The addition of the other refractory inorganic oxides, in combination with alumina, is generally effected for the primary purpose of imparting thereto certain desired physical and/or chemical characterisitcs. Regardless of the intended use, it is necessary that the alumina possess certain characteristics, both physical and chemical. When intended for use as a treating or purifying agent, the alumina should be highly porous; when utilized in conjunction with catalytically active metallic components, to effect various chemical reactions, it must be capable of yielding a final catalytic composite possessing a high degree of activity, as well as stability; when the process in which the alumina is ultimately employed is of the moving, or fluidized-bed type, it must possess a high degree of peripheral crushing strength in order to resist deterioration as a result of crushing, erosion, leaching, abrasion, etc. Although to a somewhat lesser degree, high peripheral crushing strength is also an important factor in fixed-bed processes in which large quantities of the material being processed contact the catalyst at relatively high space velocities.

The object of the present invention is to produce an alumina particle possessing a high degree of peripheral crushing strength, without the usual accompanying loss in porosity or adsorptive capacity, which at the same time, is physically capable of yielding a catalytic composite of unusually high activity and stability.

In a broad embodiment, the present invention provides a method for preparing spherical alumina particles which comprises commingling hydrogen peroxide with aluminum bromide, reacting the resultant mixture to yield an aluminum bromide-containing hydrosol, forming said hydrosol into spherical hydrogel particles, and thereafter calcining said hydrogel particles at an elevated temperature in excess of about 400° C. to convert the spherical hydrogel particles into alumina.

Although alumina is manufactured in a variety of shapes, such as pills, granules, cakes, discs, spheres, extrudates, etc., the preferred form of alumina is the sphere. Spherical alumina particles may be continuously manufactured by the oil-drop method which consists of passing droplets of a suitable aluminum-containing hydrosol into an oil bath maintained at an elevated temperature, retaining the droplets within said oil bath until they set to firm hydrogel spheroids. The hydrogel spheroids are continuously withdrawn from the oil bath, and thereafter subjected to particular aging treatments for the purpose of imparting thereto desired physical characteristics. This oil-drop method of spherical alumina production is described in greater detail in U.S. Patent 2,620,314, issued to James Hoekstra. In view of the physical characteristics of the alumina particles, prepared in accordance with the method of the present invention, such method is particularly applicable to the manufacture of spherical particles. As an illustration, the peripheral crushing strength and other surface-area characteristics of alumina particles in the form of cylindrical pills may be controlled by various physical adjustments to the particular apparatus employed in the pilling operation. On the other hand, such physical adjustments cannot successfully be made when utilizing the apparatus employed to prepare alumina in the form of spherical particles. However, as hereinafter indicated, the present method results in spherical particles possessing a 3-fold increase in peripheral crushing strength.

In another embodiment, the present invention involves a method of preparing spherical alumina which comprises adding hydrogen peroxide to aluminum bromide in an amount to yield an aluminum bromide-containing hydrosol having a bromide to aluminum mol ratio within the range of about 0.65:1 to about 0.90:1 upon effecting the reaction of the resultant mixture, forming the hydrosol into spherical hydrogel particles, and thereafter calcining said hydrogel particles at an elevated temperature in excess of about 400° C. to convert said spherical hydrogel particles into alumina.

The physical characteristics of the spherical alumina particles, resulting from the application of the present invention, are of particular advantage when utilizing the alumina particles as a carrier material in the manufacture of catalytic composites. Therefore, another embodiment of the present invention is directed toward a method for manufacturing a catalytic composite comprising alumina and at least one catalytically active metallic component, which method comprises adding hydrogen peroxide to aluminum bromide, reacting the resultant mixture to yield an aluminum bromide-containing hydrosol, forming said hydrosol into spherical hydrogel particles, thereafter calcining said hydrogel particles at an elevated temperature within the range of about 400° C. to about 800° C. to convert said hydrogel particles into alumina, and thereafter combining said catalytically active metallic component with the calcined alumina particles.

The present invention is especially advantageous in utilizing the various aluminum salts recovered from acid-digestion procedures employed in the recovery of catalytically active metallic components from "spent" catalyst. Thus, a more limited embodiment of the present invention is concerned with a method for preparing spherical alumina particles utilizing the aluminum salt recovered from the acid-digestion of an alumina-containing catalytic composite, which method comprises initially preparing a solution of said aluminum salt, adding hydrobromic acid thereto and reacting the resultant mixture to form aluminum bromide; commingling hydrogen peroxide with the aluminum bromide, and reacting the resultant mixture to yield an aluminum bromide-containing hydrosol and forming said hydrosol into spherical hydrogel particles; thereafter calcining said hydrogel particles at an elevated temperature within the range of about 400° C. to about 800° C. to convert said hydrogel particles into alumina.

An essential feature of the present invention involves the utilization of aluminum bromide and hydrogen peroxide. A suitable solution of the aluminum bromide is initially prepared; in order to avoid the possibility of contamination of the ultimate alumina particle, and consequently the catalytic composite prepared therefrom, it is preferred that the solution of aluminum bromide is an aqueous solution. Following the addition of hydrogen peroxide to the solution of aluminum bromide, the temperature of the resulting mixture is raised to the level sufficient to initiate and maintain the reaction which results in the evolution of bromine, hydrogen and other bromine distillate therefrom. The quantity of hydrogen peroxide employed, to effect the evolution of bromine and hydrogen bromide, is that amount which is sufficient to result in an aluminum bromide hydrosol having a mol ratio of bromide to aluminum within the range of about 0.65:1 to about 0.90:1. An aluminum-containing hydrosol of this particular composition is extremely well suited for subsequent formation into hydrogel spheroids prepared in accordance with the previously described oil-drop method. Following the formation of the hydrogel particles, and the subsequent aging thereof, the particles are dried at a temperature within the range of about 100° C. to about 300° C., and thereafter calcined at a temperature in excess of about 400° C., with an upper limit of about 800° C. The high-temperature calcination treatment serves to convert the hydrogel character of the spherical particles into alumina.

The most common method for preparing an aluminum-containing hydrosol utilizes aluminum chloride as the source of aluminum. In and of itself, a solution of aluminum chloride is inapplicable as the material from which the spherical hydrogel particles are formed by the oil-drop method, since it is necessary to treat the aluminum chloride for the purpose of preparing a hydrosol having a chloride to aluminum mol ratio within the aforesaid range; that is, a hydrosol having a composition which is suitable for formation into spherical hydrogel particles. One common method of reducing the chloride to aluminum mol ratio of the aluminum chloride solution, for the purpose of preparing a suitable hydrosol, is to commingle the aluminum chloride solution with substantially pure metallic aluminum. The resulting slurry is then digested at, or substantially near its boiling point, whereby the aluminum is dissolved and the chloride to aluminum mol ratio is subsequently decreased. Another method is to dissolve an excessive quantity of aluminum in concentrated hydrochloric acid. Both of these methods, however, suffer from the disadvantage of being extremely tedious and difficult to control in regard to the composition of the resulting aluminum chloride hydrosol. Furthermore, aluminum chloride cannot be utilized, according to the method of the present invention, in conjunction with hydrogen peroxide, as is aluminum bromide. That is, chlorine and/or hydrogen chloride is not evolved from the attempted reaction mixture of aluminum chloride and hydrogen peroxide, therefore, not resulting in an aluminum chloride hydrosol having the desired chloride to aluminum mol ratio within the range of about 0.65:1 to about 0.90:1. On the other hand, the utilization of aluminum bromide in a manner similar to those hereinabove described in regard to aluminum chloride, for example, digesting aluminum in aluminum bromide at a temperature at or near the boiling point of the resulting slurry, or dissolving aluminum in hydrobromic acid, does not produce the aluminum bromide hydrosol which ultimately results in spherical alumina particles having the increased crushing strength and improved surface-area characteristics.

It is not essential to the present invention that the aluminum bromide be derived from a particular source. In fact, the method of the present invention affords particular advantages when employed in conjunction with those processes designed to recover the valuable catalytically active metallic components from "spent" catalytic composites containing alumina. As an example, a great majority of these processes employ hydrochloric acid for the purpose of dissolving the alumina, recovering the catalytically active metallic components as a sludge or slurry. A substantial quantity of aluminum chloride thereby becomes available as a possible source of the aluminum in the future preparation of a hydrosol to be employed in the subsequent manufacture of spherical alumina. Generally, the aluminum chloride, or other aluminum salt, requires extensive further treating for the purposes of purification and/or concentration. By a specific application of the present invention, such aluminum salt, for example aluminum chloride, resulting from the hydrochloric acid digestion of an alumina-containing catalytic composite, is admixed with hydrogen bromide and reacted under such conditions to convert the aluminum chloride to aluminum bromide. Suitable means may be employed to collect the resulting chlorine, hydrogen chloride, or other chlorine distillate for subsequent re-use in the dissolution of the alumina from "spent catalytic composites. The resulting aluminum bromide solution is then admixed with hydrogen peroxide, in accordance with the present invention, to yield an aluminum bromide-containing hydrosol having the desired bromide to aluminum mol ratio within the range of about 0.65:1 to about 0.90:1. The bromine, hydrogen bromide or other bromine distillate, evolved from the reaction mixture of aluminum bromide and hydrogen peroxide, may be recycled internally to combine with the original aluminum chloride solution as at least a portion of the hydrogen bromide employed to convert the aluminum chloride to aluminum bromide. The aluminum bromide hydrosol is then forced into the spherical hydrogel particles which are subsequently aged according to the oil-drop method of manufacture. The aged particles are dried and calcined, as hereinbefore described, resulting in firm alumina particles. An added advantage of the method of the present invention is that the final alumina particles do not require extensive washing procedures for the purpose of removing bromide. Following the calcination at elevated temperature, the alumina spheres are substantially free from combined halogen, containing at most about 0.05% by weight of bromide. This is contrary to the procedure necessary when utilizing an aluminum chloride hydrosol in spherical alumina manufacture. The hydrogel spheroids must necessarily be subjected to extensive washing procedures, or other lengthy techniques, at some stage in the manufacturing process, to reduce the chloride concentration within the final alumina particle to the desired degree. By the method of the present invention, where halogen is desired, whether chlorine and/or fluorine, the same may be incorporated into the alumina in precise controlled amounts through the utilization of hydrogen chloride and/or hydrogen fluoride, or volatile salts such as ammonium chloride and/or ammonium fluoride.

The alumina spheres resulting from the application of the method of the present invention, find particular application in the manufacture of catalytic composites, and particularly those containing metals from groups VI and VIII of the periodic table. Since the complicated mechanism of catalysis is not fully understood, it is extremely difficult to predict, without extensive tedious experimentation, the final results of any process utilizing a particular catalyst. Similarly, it is equally difficult to formulate sound theoretical considerations explaining the nature of the results obtained through the use of a particular catalyst which has been manufactured in a particular manner. An added advantage of the method of the present invention is that the catalytic composites resulting from a combination of catalytically active metallic components with the spherical alumina particles, exhibits a significant increase in activity, particularly with respect to processes involving the reforming of hydrocarbons and mixtures of hydrocarbons.

Although the spherical alumina particles of the present invention are specifically directed to utilization as the carrier material for catalytic composites containing platinum, other platinum-group metals, such as iridium, rhodium, ruthenium, and particularly palladium, and catalytic composites containing minor quantities of other metals can be advantageously improved through its use. Other metals can be composited with the alumina in small amounts and subsequently employed therewith as components of the catalyst, and these catalysts can be improved in activity and stability through the use of the alumina particles of the present invention. Catalytic composites which can be manufactured to possess a high degree of activity and stability, by the method of the present invention, comprise metallic components such as, but not limited to, vanadium, chromium, tungsten, cobalt, molybdenum, nickel, other metals of groups VI and VIII of the periodic table, mixtures of two or more, etc. The metallic component may exist either in the elemental state or in a combined form, such as the halide, sulfate, oxide, sulfide, etc. It is understood that the benefits afforded catalysts containing different metal components are not equivalent, and that the effects of employing the method of the present invention with a particular metallic component, are not necessarily the same effects observed with regard to some other metal component, or mixtures of metal components. Generally the quantity of the platinum component composited with the catalyst is small compared to the quantities of the other components combined therewith. For example, platinum and/or palladium, and other platinum-group metals, will generally comprise a total of from about 0.1% to about 10.0% by weight of the entire catalytic composite, and usually from about 0.1% to about 3.0% by weight thereof. The utilization of other metallic components is dependent upon the ultimate use for which the particular catalyst is intended, and these other metals will usually be present in minor concentrations of 0.01% to about 1.0%, or in particular instances, up to about 8.0%. In any event, however, the concentration of the total metallic components within the composite will be small, and will generally be within the range of about 0.1% to about 10.0% by weight of the final catalytic composite. It is understood that the particular means employed to combine the catalytically active metallic components with the alumina carrier material, is not essential to the method of the present invention. I prefer to employ an impregnating technique whereby water-soluble solutions of the catalytically active metallic components are prepared to contain the desired quantity of the metallic component, such water-soluble compounds including chloroplatinic acid, ammonium molybdate, nickel nitrate hexahydrate, di-nitrito-diamino platinum, chloropalladic acid, etc. The impregnated particles are evaporated to dryness, and subsequently calcined at an elevated temperature within the range of about 400° C. to about 800° C.

The following examples are introduced to further illustrate the utility of the present invention, and to indicate the benefits afforded through the use thereof. The examples are not intended to limit the invention to the specific material, conditions and/or concentrations of the reagents involved therein.

EXAMPLE I

An aluminum chloride hydrosol, containing 12.0% by weight aluminum and 10.8% by weight of combined chloride, was prepared by digesting aluminum chloride and metallic aluminum at a temperature of about 210° F. The aluminum chloride hydrosol was then admixed with an equal volume of a 28% by weight solution of hexamethylenetetramine in water, and formed into spherical hydrogel particles in accordance with the oil-drop method previously described. The spheres were dried, at a temperature of about 200° C., and subsequently calcined at a temperature of 650° C. for a period of about one hour. Following this calcination treatment at elevated temperature, the spheres were subjected to a standard test procedure to determine the peripheral crushing strength thereof. The average peripheral crushing strength of alumina particles is determined as the arithmetic average of the force required to crush each particle of a given number of individual particles. Each particle is crushed in an apparatus constructed in such a manner that the force is applied continuously and at a uniform rate beginning with a zero load.

The crushing strength apparatus consists essentially of a balance beam resting on a knife edge. The knife edge is located at unit distance from an anvil on which the alumina particle is placed. A cup, which receives the lead shot by which the load is applied, is situated on the other side of the knife edge, four times the unit distance therefrom. The lead shot falls into this cup from a hopper at a rate of about nine pounds per minute, thus loading the alumina particles at a rate of about 36 pounds per minute. A single particle is placed on the anvil of the apparatus, and the beam balanced by means of a small spirit level. Force is applied to the particle by opening the shutter in the bottom of the hopper containing the lead shot, thus allowing the shot to flow in a continuous stream into the cup. The flow of lead shot is immediately, and automatically, cut off when the particle is completely crushed. The weight of lead shot within the cup is multiplied by a factor of four to give the actual peripheral crushing strength of the particle. The procedure is repeated 60 times and the crushing strength taken as the arithmetic average of the observed individual crushing strengths. The calcined spherical alumina particles, prepared from the aluminum chloride hydrosol, had an average crushing strength of 8.0 pounds, the highest crushing strength observed being 17.0, the lowest being 2.0 pounds. Of the 60 spheres tested, 20.0% indicated a crushing strength less than about 5 pounds. A portion of these aluminum chloride spheres were then placed in a muffle furnace and heated to a temperature of 2300° F.; as a result of this high-temperature treatment, the majority of the spheres turned into a fine powder, and the few remaining whole spheres were easily crushed by imposing light manual pressure.

An aluminum bromide hydrosol was first prepared by dissolving crystals of aluminum bromide hexahydrate in water. A 30% solution of hydrogen peroxide was added and the resulting mixture heated to a temperature of about 200° F. to initiate and maintain the reaction which caused the evolution of bromine. The resultant hydrosol had a density of 1.33 grams per milliliter and a mol ratio of bromide to aluminum of 0.69. This sol was then formed into spherical hydrogel particles by the oil-drop method. The formed spheres were washed and then dried to a temperature of 200° C., and subsequently oxidized in an atmosphere of air at a temperature of 600° C. The spheres were subjected to the extremely high-temperature treatment in the muffle furnace, at a temperature of 2300° F., and thereafter tested to determine the crushing strength thereof. Sixty of these aluminum bromide spheres indicated an average crushing strength of 23.6 pounds, the high crushing strength being 30 pounds, and the low crushing strength being 5.0. None of the particles so tested had a crushing strength less than 5 pounds, and 20% of the 60 particles so tested had a crushing strength greater than 30.0 pounds. The average crushing strength of 23.6 pounds is virtually three times that of the aluminum chloride spheres prior to the high-temperature treatment.

Both the aluminum chloride spherical particles and the particles resulting from the utilization of the aluminum bromide hydrosol, were analyzed to determine the surface area thereof. The surface area of the aluminum chloride spheres was found to be about 200 to about 250 square meters per gram, whereas the surface area of the alumina spheres prepared in accordance with the method of the present invention exhibited a surface area of 272 square meters per gram.

A second aluminum bromide hydrosol was obtained by first preparing a solution of aluminum bromide from aluminum metal and a solution of hydrobromic acid. The resulting aluminum bromide solution was then heated in combination with a 30% solution of hydrogen peroxide. Following the evolution of bromine, and other bromide distillate, the solution exhibited a density of 1.59 grams permilliliter and a bromide to aluminum mol ratio of 0.70. The spheres were dried at a temperature of 200° C. and subsequently calcined at a temperature of 600° C. The surface area of these spheres was found to be 276 square meters per gram, and the spheres indicated a peripheral crushing strength in excess of 20.0 pounds.

EXAMPLE II

As hereinbefore stated, a common method of preparing an aluminum chloride hydrosol is to dissolve an excess of aluminum in hydrochloric acid. This example is being given to illustrate the inoperability of such a method when preparing an aluminum bromide- containing hydrosol.

Substantially pure metallic aluminum (99.99%) was dissolved in hydrobromic acid, in the absence of hydrogen peroxide, to yield a hydrosol containing 12.0% by weight of aluminum, and 10.8% by weight of combined bromide. The hydrosol was then admixed with an equal volume of a 28% by weight solution of hexamethylenetetramine in water, and formed into spherical hydrogel particles according to the oil-drop method. The spheres were dried at a temperature of about 200° C., and subsequently calcined at a temperature of 650° C., for a period of one hour.

Sixty of these spherical alumina particles exhibited an average crushing strength of only 4.3 pounds, the high being 13.5 and the low being 2.0 pounds; 83.3% of the spheres indicated a crushing strength of less than 5.0 pounds. As previously set forth in Example I, the spheres prepared in accordance with the method of the present invention, indicated an average crushing strength of 23.6 pounds, and none of the spheres had a crushing strength less than 5.0 pounds.

A catalyst was prepared in accordance with the method of the present invention from an aluminum bromide hydrosol having a bromide to aluminum mol ratio of 0.69. The sol had been prepared by commingling 30% by weight hydrogen peroxide with a solution of aluminum bromide hexahydrate at a temperature of about 210° F. The hydrosol was subsequently formed into spherical hydrogel particles in accordance with the oil-drop method, and the particles were subsequently dried and calcined to form alumina. These alumina particles were commingled with 99 milliliters of an aqueous solution of chloroplatinic acid containing 10 milligrams of platinum per milliliter plus 60 milliliters of water. The mixture was evaporated to dryness and further dried in a rotary drier for a period of 3 hours; the spheres were thereafter subjected to a calcination treatment, in the presence of air, at a temperature of 500° C. for a period of one hour. This catalyst was subjected to the activity test hereinafter described.

The catalyst portion was subjected to a particular activity test which consisted of passing a standard hydrocarbon charge stock, having a boiling range of about 200° F. to about 400° F., and substantially free from water, through the catalyst at a liquid hourly space velocity (volumes of hydrocarbon charge per volume of catalyst) of about 2.0, and in an atmosphere of hydrogen present in a mol ratio of hydrogen to hydrocarbons of 10:1, for a period of about 10 hours. The reaction zone was maintained at a temperature of 500° C., and under an imposed pressure of 500 pounds per square inch. The liquid product collected from the reaction zone, over the entire period of the test, was analyzed for its octane rating (F-1 clear).

Activity Testing Data

Composition:
  Platinum _____ wt. percent__ 0.750
  Fluoride _____ do___ ____
  Chloride _____ do____ 0.600
Product octane rating, F-1 clear _____ 95.8
Excess receiver gas _____ s.c.f./bbl__ 1110
Excess debutanizer gas _____ s.c.f./bbl__ 335
Total excess gas _____ s.c.f./bbl__ 1445
Debutanizer gas ratio _____ 0.232

For the purpose of having a clear understanding of the activity testing data, several definitions are presented: (1) the excess receiver gas is that quantity of gas in excess of the amount required to maintain the desired pressure within the reaction zone, and analyses have shown that this gas is, for all practical purposes, substantially pure hydrogen (approximately 95 mol percent); (2) The excess debutanizer gas is that gas which is composed of light paraffinic hydrocarbons, methane, ethane and propane, and results mainly from the hydrocracking reactions effected within the reaction zone; (3) The debutanizer gas ratio is a ratio of excess debutanizer gas to the total excess gas, and is indicative of the balance effected among the various reactions, and the relative yield of desirable product in the effluent from the reaction zone—i.e. the lower the ratio, the greater the yield of liquid product.

The beneficial results afforded the manufacture of catalytic composites, utilizing the alumina spheres of the present invention as the carrier material, are readily ascertained from the data indicated in the table. The catalyst prepared according to the method of the present invention resulted in a product possessing an octane rating of 95.8, without the addition of tetraethyl lead. Of greater significance, however, is the fact that the catalyst of the present invention resulted in a substantial degree of hydrogen production (1110 standard cubic feet per barrel) while at the same time exhibited a comparatively low degree of light paraffinic hydrocarbon production. The debutanizer gas ratio of 0.232 indicates that the catalyst of the present invention, while producing a high quality product, will result in a significant volumetric yield of this product.

The foregoing examples clearly illustrate the method of the present invention for the preparation of spherical alumina particles, and indicate the benefits to be afforded through the utilization thereof, particularly in regard to use as a carrier material in the manufacture of catalytic composites.

I claim as my invention:

1. A method of preparing spherical alumina which comprises reacting hydrogen peroxide with aluminum bromide in an amount to yield an aluminum bromide-containing hydrosol having a bromide to aluminum mol ratio within the range of about 0.65:1 to about 0.90:1, forming the hydrosol into spherical hydrogel particles, and thereafter calcining said hydrogel particles at an elevated temperature in excess of about 400° C. to convert said spherical hydrogel particles into alumina.

2. A method for manufacturing a catalytic composite comprising alumina and a catalytically active metallic component, which method comprises reacting hydrogen peroxide with aluminum bromide in an amount to yield an aluminum bromide-containing hydrosol having a bromide to aluminum mol ratio within the range of about 0.65:1 to about 0.90:1, forming said hydrosol into spherical hydrogel particles, thereafter calcining said hydrogel particles at an elevated temperature within the range of about 400° C. to about 800° C. to convert said hydrogel particles into alumina, and thereafter combining said catalytically active metallic component with the calcined alumina particles.

3. The method of claim 2 further characterized in that said catalytically active metallic component comprises platinum.

4. The method of claim 2 further characterized in that said catalytically active metallic component comprises palladium.

5. A method for manufacturing an alumina-platinum catalytic composite which comprises reacting hydrogen peroxide with aluminum bromide in an amount to yield an aluminum bromide-containing hydrosol having a bromide to aluminum mol ratio within the range of about 0.65 to about 0.90:1, forming said hydrosol into spherical hydrogel particles, thereafter calcining said hydrogel particles at an elevated temperature within the range of about 400° C. to about 800° C. to convert said hydrogel particles into alumina, and thereafter combining said calcined alumina particles with a platinum-containing compound to yield a catalytic composite containing from about 0.1% to about 10.0% by weight of platinum.

6. A method for preparing spherical alumina particles utilizing the aluminum salt recovered from the acid-digestion of an alumina-containing catalytic composite which comprises initially preparing a solution of said aluminum salt, adding hydrobromic acid thereto and reacting the resultant mixture to form aluminum bromide; reacting hydrogen peroxide with the aluminum bromide in an amount to yield an aluminum bromide-containing hydrosol having a bromide to aluminum mol ratio within the range of about 0.65:1 to about 0.90:1, and forming said hydrosol into spherical hydrogel particles; thereafter calcining said hydrogel particles at an elevated temperature within the range of about 400° C. to about 800° C. to convert said hydrogel particles into alumina.

7. The method of claim 5 further characterized in that said aluminum salt is aluminum chloride resulting from the hydrochloric acid digestion of an alumina-containing catalytic composite.

References Cited in the file of this patent

UNITED STATES PATENTS 2,895,920    Janoski _____ July 21, 1959